United States Patent
Gupta et al.

(10) Patent No.: US 9,351,130 B2
(45) Date of Patent: May 24, 2016

(54) SYSTEM AND METHOD FOR EFFICIENT STATE SYNCHRONIZATION AMONG NEIGHBORING NETWORK DEVICES

(71) Applicant: Aruba Networks, Inc., Sunnyvale, CA (US)

(72) Inventors: Manoj Gupta, Santa Clara, CA (US); Santashil PalChaudhuri, West Bengal (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 162 days.

(21) Appl. No.: 13/931,629

(22) Filed: Jun. 28, 2013

(65) Prior Publication Data

US 2015/0003284 A1     Jan. 1, 2015

(51) Int. Cl.
| H04L 12/28 | (2006.01) |
| H04L 12/26 | (2006.01) |
| H04H 20/71 | (2008.01) |
| H04W 4/00 | (2009.01) |
| H04L 12/66 | (2006.01) |
| G06F 15/173 | (2006.01) |
| H04W 4/08 | (2009.01) |
| H04W 72/00 | (2009.01) |
| H04L 12/24 | (2006.01) |
| H04L 12/18 | (2006.01) |

(52) U.S. Cl.
CPC .............. *H04W 4/08* (2013.01); *H04W 72/005* (2013.01); *H04L 12/185* (2013.01); *H04L 41/0816* (2013.01)

(58) Field of Classification Search
None
See application file for complete search history.

(56) References Cited

U.S. PATENT DOCUMENTS

| 7,558,199 | B1 * | 7/2009 | Minei et al. | 370/230 |
| 8,027,262 | B2 * | 9/2011 | Kawarai et al. | 370/241 |
| 2001/0047407 | A1 * | 11/2001 | Moore et al. | 709/223 |
| 2004/0156370 | A1 * | 8/2004 | Bush | 370/400 |
| 2009/0046614 | A1 * | 2/2009 | Lewis et al. | 370/312 |
| 2011/0149766 | A1 * | 6/2011 | Choi et al. | 370/252 |
| 2012/0026887 | A1 * | 2/2012 | Vempati | 370/241 |
| 2013/0083749 | A1 * | 4/2013 | Xu et al. | 370/329 |
| 2014/0355564 | A1 * | 12/2014 | Cherian et al. | 370/331 |

* cited by examiner

*Primary Examiner* — Kiet Tang
(74) *Attorney, Agent, or Firm* — Hewlett Packard Enterprise Patent Department (57) ABSTRACT

According to one embodiment of the invention, a non-transitory computer readable medium comprising instructions which, when executed by one or more hardware processors, causes performance of operations including detecting, by a first network device, a second network device within a radio frequency (RF) communication range from the first network device. Responsive at least to detecting the second network device, the first network device subscribes to a multicast group associated with the second network device. Thereafter, the first network device receives multicast data associated with the multicast group associated with the second network device.

27 Claims, 9 Drawing Sheets

SYSTEM AND METHOD FOR EFFICIENT STATE SYNCHRONIZATION AMONG NEIGHBORING NETWORK DEVICES

FIELD

Embodiments of the present disclosure relate to the field of network communications, and in particular a system and method for distributing state information among neighboring wireless devices for state synchronization.

BACKGROUND

Over the past decade, there has been a substantial increase in the use and deployment of wireless devices, from dual-mode smartphones to tablet devices. With "wireless" becoming the de-facto medium for network connectivity among users, it has become increasingly important for certain wireless devices, such as access points (APs) for example, to share state information and remain in synchronous operation with each other. This allows users to maintain seamless connectivity with a particular distributed wireless network.

Currently, distributed wireless networks are generally implemented with a centralized controller that manages the sharing and storage of state information among the networked APs. However, controller-based wireless networks possess certain challenges: (1) single point of failure; and (2) scalability. In fact, as more and more wireless devices are purchased and used by consumers, in some cases where multiple wireless devices (e.g. phone, laptop, tablet, etc.) are used simultaneously by a single user, network scalability has become a challenge. To address increased capacity requirements for the network, more expensive and powerful controllers are typically needed, thereby increasing overall network costs.

Furthermore, if shared state information is only relevant for localized decisions (e.g. Adaptive Radio Management "ARM" channel allocation), it may not be necessary to share this state information with the centralized controller. Thus, by uploading such information to the controller unnecessarily, network bandwidth is being wasted. However, requiring the APs to discern what shared state information is or is not relevant for global decisions would greatly increase the operational complexity of the APs.

In lieu of controller-based wireless networks, controllerless wireless networks may be deployed. With such deployment, however, it is imperative to solve the complex challenges of sharing state information within a distributed network to optimize network functionality.

BRIEF DESCRIPTION OF THE DRAWINGS

Embodiments of the present disclosure are illustrated by way of example, and not by way of limitation, in the figures of the accompanying drawings and in which.

DETAILED DESCRIPTION

In the following description, several specific details are presented to provide a thorough understanding of the invention. The context of the disclosure is directed to state synchronization among surrounding network devices (e.g. access points "APs") through any one of a plurality of distribution schemes, including wireless (over-the-air) distribution, multicast distribution and/or wired distribution. Whichever distribution scheme is utilized for state synchronization, the network devices now are configured to operate collectively so that the functionality of the wireless network may be optimized through adjustments to its operation and/or capabilities (hereinafter generally referred to as "functionality") of one or more network devices. One skilled in the relevant art may recognize, however, that the concepts and techniques disclosed herein can be practiced without certain details such as the inclusion or exclusion of one or more operations, various logic, or the like.

Herein, certain terminology is used to describe features within embodiments of the invention. For example, the term "network device" generally refers to electronic equipment configured to communicate over a network and/or process information related to such communications. Different categories of network devices may include, but are not limited to (1) a client device being any consumer electronics with wireless network connectivity (e.g., tablet; laptop; desktop; netbook; television; set-top box; video gaming control; mobile handset with cellular and/or wireless connectivity such as a smartphone, personal digital assistant "PDA"; etc.); (2) an access point; (3) a data control device (e.g., network switch, controller, etc.); (4) a multicast router; or the like. The network device may be adapted with circuitry to support wireless connectivity with other network devices being part of a wireless network.

It is contemplated that a network device includes hardware logic such as one or more of the following: (i) processing circuitry; (ii) one or more communication interfaces such as a radio (e.g., component that handles the wireless data transmission/reception) and/or a physical connector to support wired connectivity; and/or (iii) a data store in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes a grouping of data, which may be placed in the form of a packet, a stream (e.g., a sequence of packets), a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

General Network Overview

Figure 1:
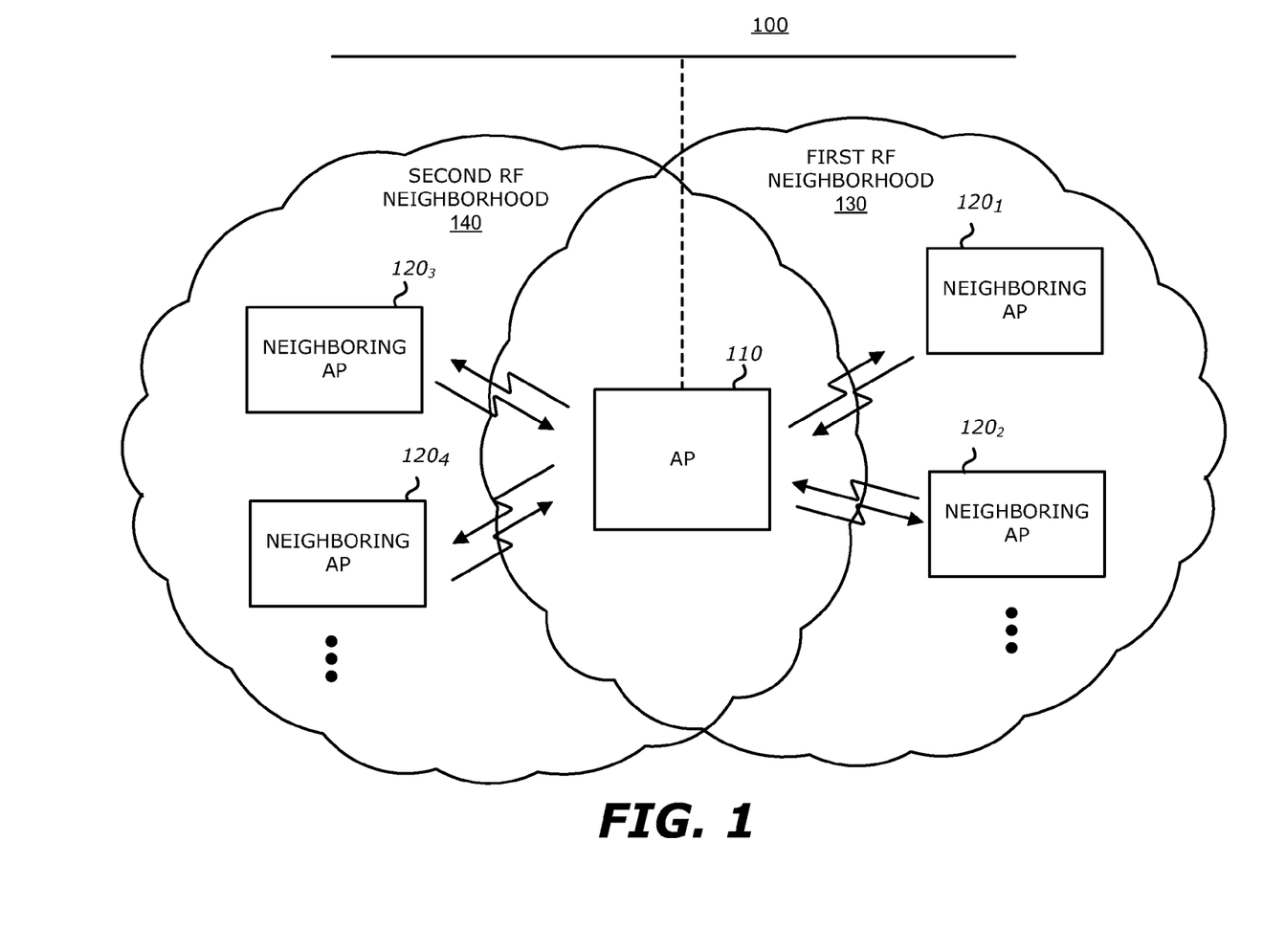
FIG. 1 is a general block diagram of a wireless network with state synchronization being conducted by a network device and its neighboring network devices operating within both a first radio frequency (RF) neighborhood and a second RF neighborhood.

Referring to FIG. 1, a general block diagram of a first network device 110 (e.g. access point "AP") and one or more other network device $120_1$-$120_M$ (e.g. neighboring access point(s)) communicatively coupled together via a network 100 is shown. AP 110 and neighboring AP(s) $120_1$-$120_M$ (M≥1, M=4 as shown) exchange state information in accordance with a synchronized distribution scheme, where the state information from any one of these APs 110 and $120_1$-$120_4$ may cause another one of the APs to reduce its functionality. In the alternative or in combination with other uses, the state information may be used to control access by one or more client devices (not shown) to the network 100.

According to this embodiment of the disclosure, network 100 is a wireless local area network (WLAN) operating in compliance with the Institute of Electrical and Electronic Engineers (IEEE) 802.11 Standard entitled "Part 11: Wireless LAN Medium Access Control (MAC) and Physical Layer (PHY) specifications," Mar. 29, 2012. However, it is contemplated that network 100 may support any of a number of other wireless communication schemes including HiperLan/1, HiperLan/2, IEEE 802.16 Standard, or the like.

As illustrated, the infrastructure of network 100 is a collection of network devices that is adapted to support communications between client devices and resources on the network 100. As illustrated, AP 110 is configured to provide and maintain network connectivity over a first wireless channel (referred to as its "home channel") with one or more client devices that are associated to and authenticated by AP 110. However, at different prescribed times, AP 110 is adapted to scan one or more other wireless channels (referred to as its "foreign channels") to acquire state information from neighboring APs $120_1$-$120_4$. During a scan session, AP 110 may scan one of its foreign channels, where this channel constitutes a home channel for one or more of the neighboring APs $120_1$-$120_4$.

More specifically, according to one embodiment of the disclosure, AP 110 is configured to scan, at a first prescribed time interval, for wireless communications over a second wireless channel. One purpose for such scanning is to obtain state information from other wireless network devices, such as neighboring APs $120_1$ and $120_2$ for example, which are operating on the second wireless channel being their home channel and are residing within a first (one-hop) radio frequency (RF) neighborhood 130. The first RF neighborhood 130 is defined by a first radio frequency (RF) communication range from AP 110. Of course, state information may be obtained for network devices operating outside the first RF neighborhood 130, such as a remote AP within an N-hop RF neighborhood (N≥2), by one of the neighboring APs (e.g., neighboring AP $120_1$) obtaining state information from the remote AP and subsequently distributing such state information to AP 110.

As further shown in FIG. 1, AP 110 is configured to scan, at a second prescribed time interval different than the first prescribed time interval, for wireless communications over a third wireless channel within a second RF neighborhood 140. The third wireless channel is different, and normally non-interfering, from the second wireless channel. Defined by a second RF communication range from AP 110, the second RF neighborhood 140 comprises neighboring AP $120_3$ and $120_4$.

It is contemplated that the distribution of state information between AP 110 and neighboring APs $120_4$-$120_4$ is accomplished during different scan sessions. These scan sessions may be performed by active scanning a particular (wireless) foreign channel, where AP 110 transmits a message (e.g. PROBE REQUEST message), as a broadcast or unicast transmission, and subsequently monitors that particular foreign channel for one or more messages in response to the transmitted message (e.g. PROBE RESPONSE messages). Alternatively or in combination with active scanning, passive scanning of the particular foreign channel may be conducted, where AP 110 detects a message transmitted over the particular wireless channel (e.g., a BEACON message) and stores information associated with that message.

Figure 2:
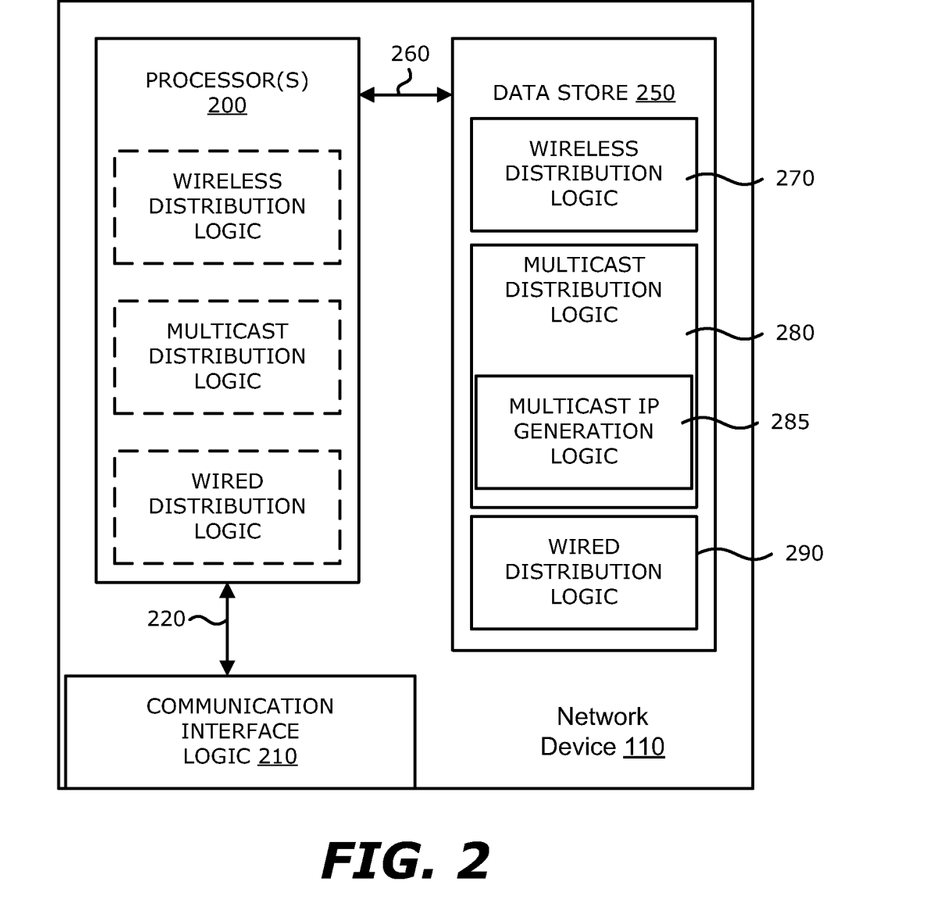
FIG. 2 is an exemplary block diagram of logic implemented within network device (AP) of FIG. 1 that is utilized for state synchronization with neighboring network devices.

Referring now to FIG. 2, an exemplary block diagram of logic implemented within a network device (e.g. AP 110) of FIG. 1 that exchanges in synchronization state information with neighboring network devices (e.g., neighboring APs $120_1$-$120_4$) is shown. Herein, AP 110 comprises one or more hardware processors 200 that are coupled to communication interface logic 210 via a first interconnect 220. According to one embodiment of the disclosure, communication interface logic 210 may be implemented as a physical interface such as an IEEE 802.3 Ethernet interface and/or one or more radio units (e.g. hardware transceiver, transmitter/receiver, etc.) for supporting wireless communications with other wireless network devices.

Processor 200 is further coupled to a data store 250 via a second interconnect 260. According to one embodiment of the disclosure, data store 250 is persistent memory that is adapted to store wireless distribution logic 270, multicast distribution logic 280 and wired distribution logic 290. As shown, logic 270, 280 and/or 290 comprise software modules executed by processor(s) 200 to control distribution of state information between AP 110 and other neighboring APs $120_1$-$120_M$ illustrated in FIG. 1. However, it is contemplated that one or more of logic 270, 280 and/or 290 may be implemented as either circuitry within processor(s) 200 (represented by dashed lines) or other circuitry within AP 110 (not shown).

In general, wireless distribution logic 270 is configured to conduct active scanning of predetermined wireless channels to exchange state information with neighboring APs, where such scanning may be conducted through a series of messages, such as an exchange of data messages or management messages such as PROBE REQUEST and PROBE RESPONSE messages.

More specifically, according to one embodiment of the disclosure, AP 110 has access to network resources to obtain information directed to what wireless channels are identified as "home channels" for the neighboring APs and are different from its home channel. During every scan session on a selected foreign channel (home channel for the neighboring AP), AP 110 sends a PROBE REQUEST message that includes an information element containing the state information for AP 110. Hence, the neighboring APs (e.g., neighboring APs $120_1$ and $120_2$) operating on this channel receive the state information.

In response to receiving the PROBE REQUEST message, neighboring AP $120_1$ sends a PROBE RESPONSE message, which contains state information for that neighboring AP $120_1$. The PROBE RESPONSE message is received by AP 110. Similarly, neighboring AP $120_2$ also sends a PROBE RESPONSE message containing state information for neighboring AP $120_2$ in response to receiving the PROBE REQUEST message. The PROBE RESPONSE message is received by AP 110. Hence, during one scan interval, AP 110 and its neighboring APs $120_1$ and $120_2$ listening on that particular wireless channel will share their state information with each other.

Furthermore, as an optional feature, the wireless distribution logic 270 may be adapted to repeat an attempt to scan the same foreign channel when a scan reject occurred due to one or more state conditions associated with AP 110 (e.g. AP processing voice, audio or another type of data requiring higher Quality of Service (QoS) levels; power-save; AP load limit at threshold, etc.). The reason is that, since the scan reject was not based on conditions of the foreign channel, the changing of the foreign channel will not assist in achieving a successful scan. By repeating the attempt to scan that particular foreign channel, after a predetermined time period has elapsed or once the state condition has been alleviated, a more deterministic real-time guarantee on the scanning pattern of AP 110 is achieved. As a result, all wireless channels are scanned uniformly.

Multicast distribution logic 280 is configured to enable AP 110 to subscribe to a multicast group associated with one or more neighboring APs $120_1$, . . . , and/or $120_M$ based on information associated with neighboring APs $120_1$, . . . , and/or $120_M$. For instance, the multicast Internet Protocol (IP) addresses for AP 110 as well as neighboring APs $120_1$-$120_M$ are based on their corresponding Media Access Control (MAC) addresses.

More specifically, according to one embodiment of the disclosure, every AP is assigned its multicast Internet Protocol (IP) address based on its MAC address. The MAC address of every AP is advertised in an information element (Vendor-Specific IE) within every "p" number of BEACON messages ($p \geq 1$). Hence, AP 110 receiving BEACON messages from neighboring APs $120_1$-$120_M$ is able to derive the multicast IP of each neighboring AP $120_1$-$120_M$ from the recovered MAC address based on operations conducted by multicast IP generation logic 285. As a result, AP 110 is able to subscribe to the multicast groups hosted by its neighboring APs $120_1$-$120_M$. This allows AP 110 as well as the neighboring APs $120_1$-$120_M$ to publish their state information via these multicast groups. The publication of the state information by each of the APs 110 and $120_1$-$120_M$ may be scheduled to occur at assigned time periods, during each scan session, after every other scan session or other prescribed periodicity, in response to receipt of a particular message, or the like.

According to another state information distribution scheme, as stated above, the MAC address of every AP is advertised in an information element within a BEACON message, every "p" number of BEACON messages. All the APs in the same broadcast domain maintain a list of MAC addresses of neighboring APs. In the event that AP 110 needs to publish its own state information, wired distribution logic 290 of AP 110 is configured to control the broadcast of a message in its subnet, where the message includes state information for AP 110 and identifies AP 110 in a source address of the message. In response to receiving the broadcasted message from AP 110, each of the neighboring APs $120_1$-$120_M$ will process the message if the source address of the message is associated with a RF neighbor (e.g. AP 110).

If the neighboring APs do not belong to the same subnet, then a broadcast transmission will be unsuccessful. Instead, unicast messages will need to be sent from AP 110 to neighboring APs $120_1$-$120_M$.

Exemplary State Information Distribution Schemes

A. Wireless Distribution of State Information Between Network Devices

Figure 3:
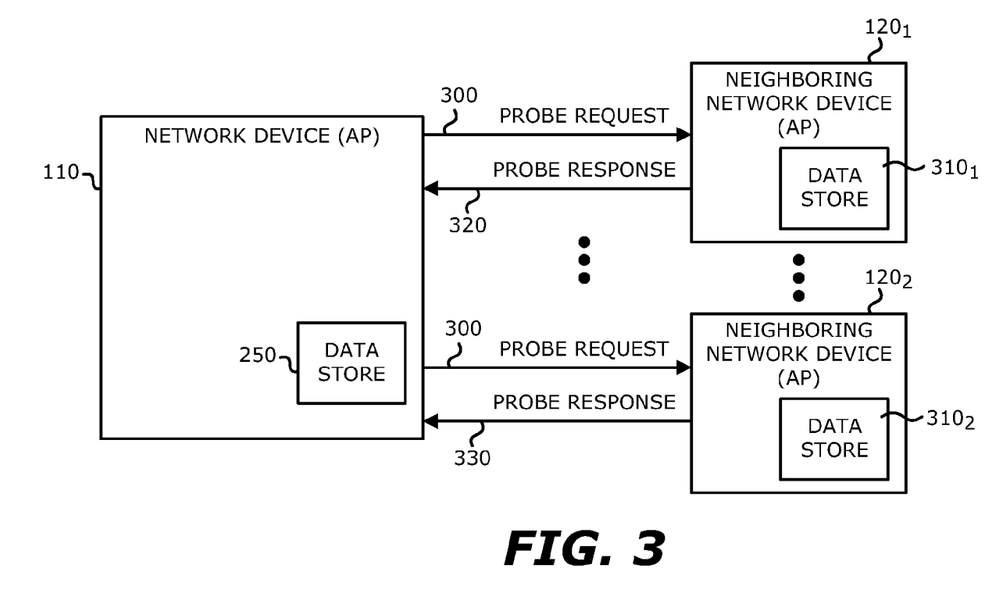
FIG. 3 is an exemplary block diagram illustrating an over-the-air distribution scheme conducted by the network device (AP) of FIGS. 1 and 2 for state synchronization using Probe Request and Probe Response messages.

Referring to FIG. 3, an exemplary block diagram illustrating a wireless (over-the-air) distribution scheme conducted by a network device (e.g., AP 110 of FIGS. 1 and 2) for state synchronization using an exchange of messages is shown. According to one embodiment of the disclosure, as described below, the exchanged messages may be PROBE REQUEST and PROBE RESPONSE frames, which have a lesser effect on network overhead. However, it is contemplated that the exchanged messages may be a different message types such as data frames for example.

Herein, AP 110 has access to resources, including the MAC addresses of neighboring APs and their home channels. Such information may be stored remotely from AP 110 (e.g. within a database maintained by another network device) or stored locally within data store 250. During a scan session, AP 110 broadcasts a PROBE REQUEST message 300, which includes state information for AP 110, over a second wireless channel. While the second wireless channel constitutes a first foreign channel for AP 110, the second wireless channel operates as the home channel for neighboring APs $120_1$ and $120_2$.

Figure 4:
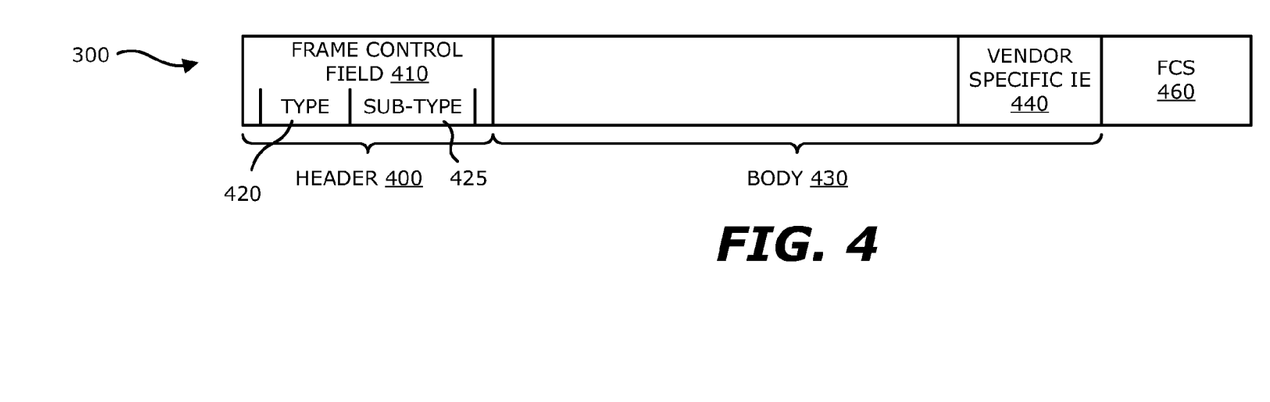
FIG. 4 is an exemplary data structure diagram of a Probe Request message of FIG. 3.

Referring now to FIG. 4, an exemplary data structure diagram of the PROBE REQUEST frame 300 of FIG. 3 is shown. Herein, PROBE REQUEST frame 300 comprises a header 400, a frame body 430 and a frame check sequence (FCS) 460. Herein, in compliance with the IEEE 802.11 Standard, the header 400 comprises a frame control field 410, which includes a type field 420 that identifies the frame as a management frame type ("00") and a subtype field 425 that identifies this management frame as a Probe Request subtype ("0100").

Figure 5:
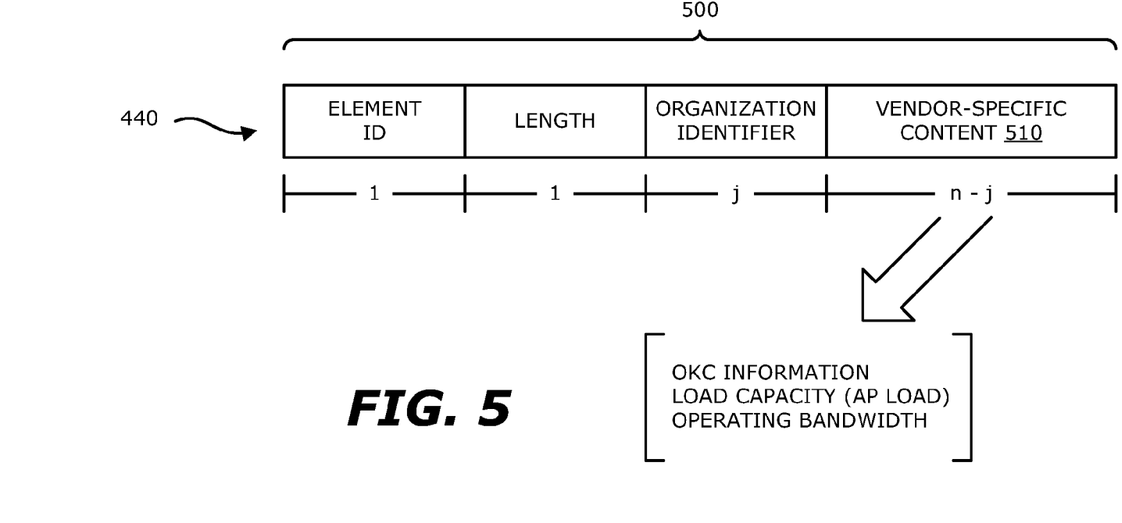
FIG. 5 is an exemplary data structure diagram of fields within the vendor specific information element of the Probe Request message of FIG. 4.

The frame body 430 includes a vendor specific information element 440 that contains state information associated with AP 110. As shown in FIG. 5, the vendor specific information element 440 comprises multiple subfields 500 in which the state information is stored within a vendor-specific content field 510. Such state information may include, but is not limited or restricted to (i) one or more Opportunistic Key Caching (OKC) information stored by AP 110, ((ii) load capacity of AP 110 (e.g. number of associated client devices, maximum capacity level, processor utilization, etc.), (iii) operating bandwidth to convey primary/secondary wireless channels used by AP 110, or the like. Currently, the vendor specific information element 440 is not used for the transfer of any state information by its transmitting network device.

Referring back to FIG. 3, neighboring APs $120_1$ and $120_2$ operating on the second wireless channel receive the PROBE REQUEST message 300, and thereafter, retrieve the state information for AP 110. Such information is stored within corresponding data stores $310_1$ and $310_2$.

Figure 6:
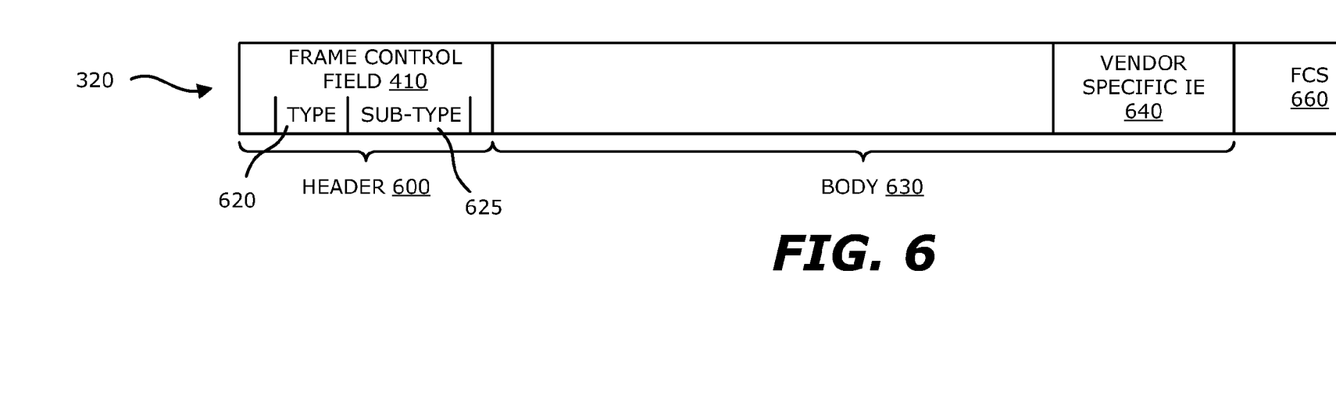
FIG. 6 is an exemplary data structure diagram of a Probe Response message of FIG. 3.

In response to the PROBE REQUEST message 300, both neighboring APs $120_1$ and $120_2$ return PROBE RESPONSE message 320/330 containing their own state information. As shown in FIG. 6, PROBE RESPONSE frame 320 comprises a header 600, a frame body 630 and a frame check sequence (FCS) 660.

Herein, in compliance with the IEEE 802.11 Standard and having a similar frame format as the PROBE REQUEST frame 300, the header 600 of PROBE RESPONSE frame 320 includes a frame control field 610 that includes a type field 620 that identifies the frame as a management frame type ("00") and a subtype field 625 that identifies this management frame as a Probe Response subtype ("0101"). Also, the frame body 630 includes a vendor specific information element 640 that contains state information associated with neighboring AP $120_1$.

The PROBE RESPONSE frame 330 has an identical format as PROBE RESPONSE frame 320, except the vendor specific information element includes state information associated with neighboring AP $120_2$.

Figure 7:
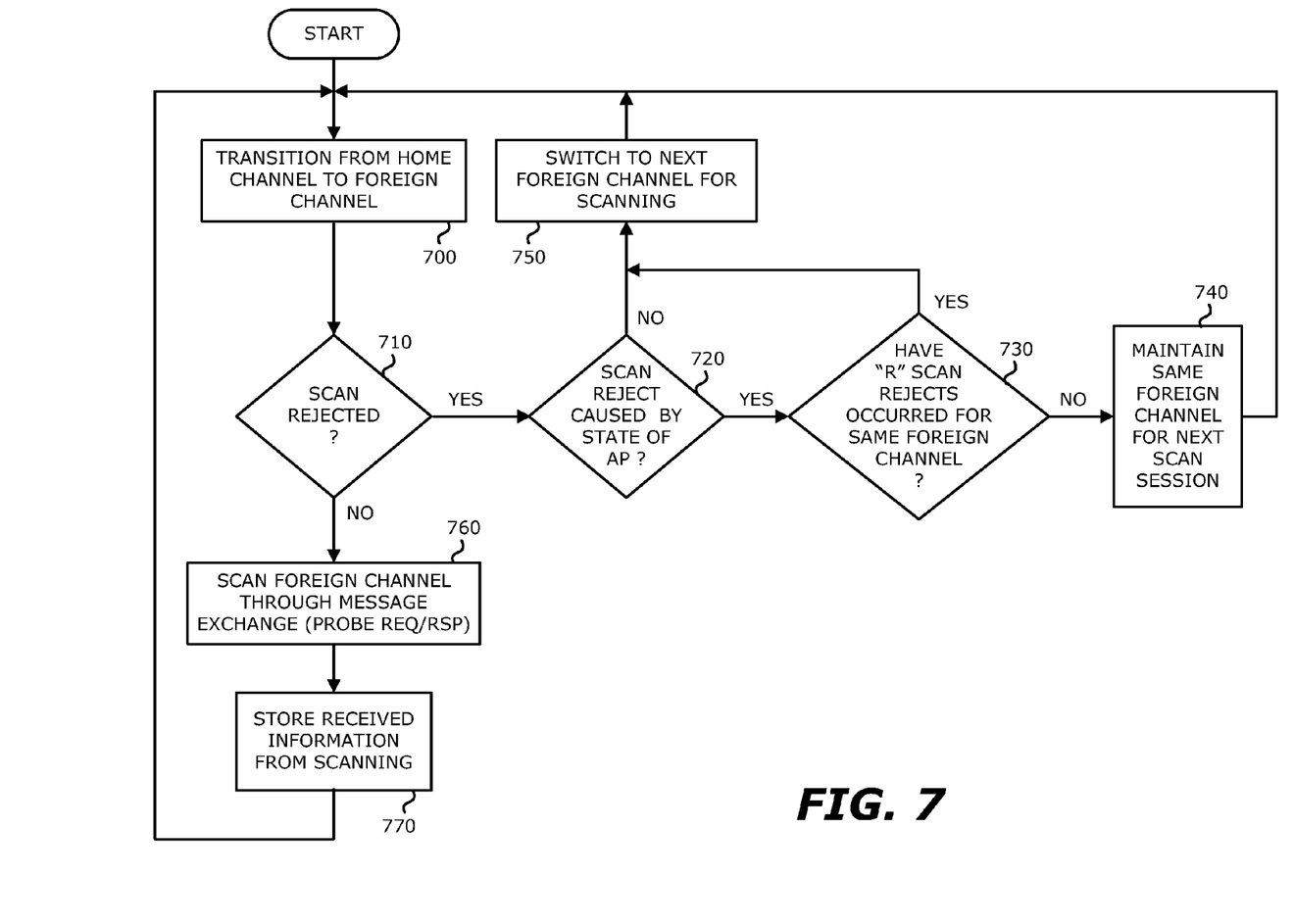
FIG. 7 is an exemplary flowchart illustrating scanning operations conducted by the network device (AP) of FIGS. 1 and 2 for state synchronization.

Referring now to FIG. 7, an exemplary flowchart illustrating a scan session conducted by a network device (e.g., AP) for state synchronization is shown. Initially, the AP transitions from its home channel to a foreign channel to commence a scan session (block 700). This may occur after the AP has remained on the home channel for a first predetermined time interval and now scans a particular foreign channel for a second predetermined time interval that is substantially less than the first predetermined time interval. For example, the first predetermined time interval may be multiple seconds in duration (e.g. 10 seconds) while the second predetermined time interval may be less than one-hundred milliseconds (ms) such as 70 ms for example.

In the event of a scan reject, namely the scan session on the foreign channel is not performed as scheduled, a determination is made as to whether the scan reject is due to the state of the AP (blocks 710 and 720). For instance, if the client devices associated to the AP are in power save state or is supporting an active transmission of high priority data (e.g., video and/or audio), the scan session is not conducted as the QoS for the ongoing services provided by the AP would be greatly diminished. If the scan reject is not the $R^{th}$ successive scan reject for the particular foreign channel, where "R" may be set to a desired tolerance (R=2, 3, etc.), the next scan session will be repeated for the same foreign channel (blocks 730 and 740). Otherwise, a new foreign channel is selected to be scanned during the next scan session (block 750).

If there is no scan reject, the AP actively scans the foreign channel through a message exchange and receives the state information for those neighboring APs participating in the message exchange (blocks 760 and 770). Thereafter, for the next scan process, a different foreign channel (if any) is selected and the scan process repeats as described above.

Figure 8:
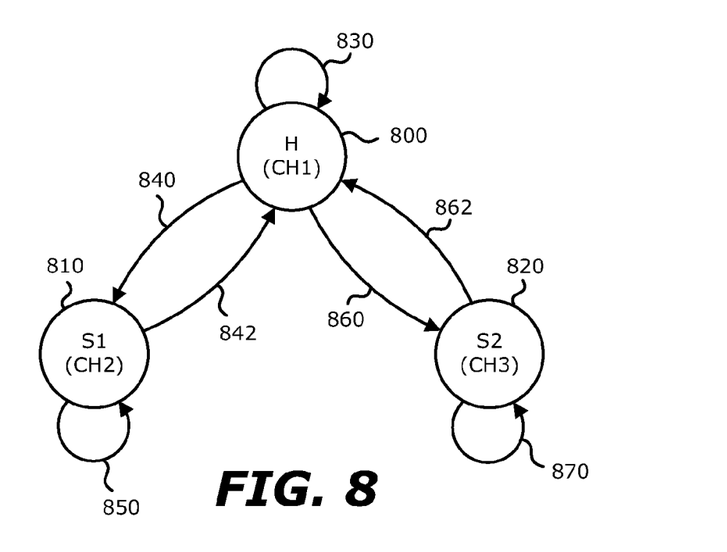
FIG. 8 is an exemplary state diagram illustrating the scanning states entered into by the network device (AP) of FIGS. 1 and 2 during state synchronization.

Referring to FIG. 8, an exemplary state diagram illustrating the scanning states entered into by a network device (e.g. AP) during state synchronization is shown. As shown, the AP is configured to enter into a first state (H state 800), where the AP provides one or more client devices associated to the AP access to network resources over a home channel (CH1). The AP is further configured to enter into a second state (S1 state 810) and/or a third state (S2 state 820). In S1 state 810, the AP conduct a scan session over a first foreign channel (CH2) while, in the S2 state 820), the AP conduct a scan session over a second foreign channel (CH3).

Herein, the AP operates by monitoring and responding to wireless communications directed to the AP on the home channel (CH1) as shown by state operation 830. In the event that there are no state conditions to preclude the AP from conducting a scan session, the AP transitions from H state 800 to S1 state 810, which is represented by transition 840. During S1 state 810, the AP sends a PROBE REQUEST frame, receives one or more PROBE RESPONSE frames from neighboring APs with their home channel being the AP's first foreign channel (CH2), and stores the state information provided by the neighboring APs (state operation 850). After the scan session has ceased, the AP transitions back to the H state 810 as shown by transition 842.

In the event that there is a state condition that precludes the AP from conducting a scan session, such as the AP supporting an active video download by a client device, the AP remains in H state 800. However, during the next scan session and once no further state conditions are present, the AP transitions to the S1 state 810 and conducts a scan session as described above. The successive attempt to scan the first foreign wireless channel, for at least R scan rejects, is conducted to guarantee an exchange of state information between the AP and its neighboring APs operating on this channel (CH2).

Now, upon return to its home channel, the AP operates by monitoring and responding to wireless communications directed to the AP on the home wireless channel, as shown by state operation 830. In the event that there are no state conditions to preclude the AP from conducting a scan session, the AP transitions to S2 state 820 as represented by transition 860. During the S2 state, the AP sends a PROBE REQUEST message, receives one or more PROBE RESPONSE messages from neighboring APs where their home channel is the second foreign channel (CH3) for the AP, and stores the state information provided by these neighboring APs (state operation 870). After the scan session has ceased, the AP transitions back to the H state 810 as illustrated by transition 862 and the process continues.

Herein, the maximum expected time of state information advertisement computed for an illustrative wireless network having "C" channels with "H" home channels for neighboring APs, a scan interval of duration "P", and a 99% guaranteed delivery probability "P(s)" is set forth below:

"P(s)" is configurable and depends on the state information criticality.

Assuming "α" is the probability of scan reject.

$$\Rightarrow \text{probability of scan success} = (1 - \alpha). \quad (1)$$

$$\Rightarrow \text{probability of success after } N \text{ tries} = 1 - \alpha^N.$$

$$\Rightarrow N = \frac{\log(1 - P(s))}{\log \alpha}$$

Assuming: "C" is the number of total channels necessary to scan, "H" is the number of home channels of neighboring APs, and "P" is the scan interval.

The maximum expected time of information delivery "E(T)" is given by equation (2):

$$E(T) = C \times P + H \ast P(N-1) \quad (2)$$

Assuming, C=24 in a-band, H=5, P=10 seconds, α=0.1, and P(S)=99%:

$$E(T) = 240 + 50 = 290 \text{ seconds}.$$

B. Multicast Distribution of State Information Between Network Devices

Figure 9:
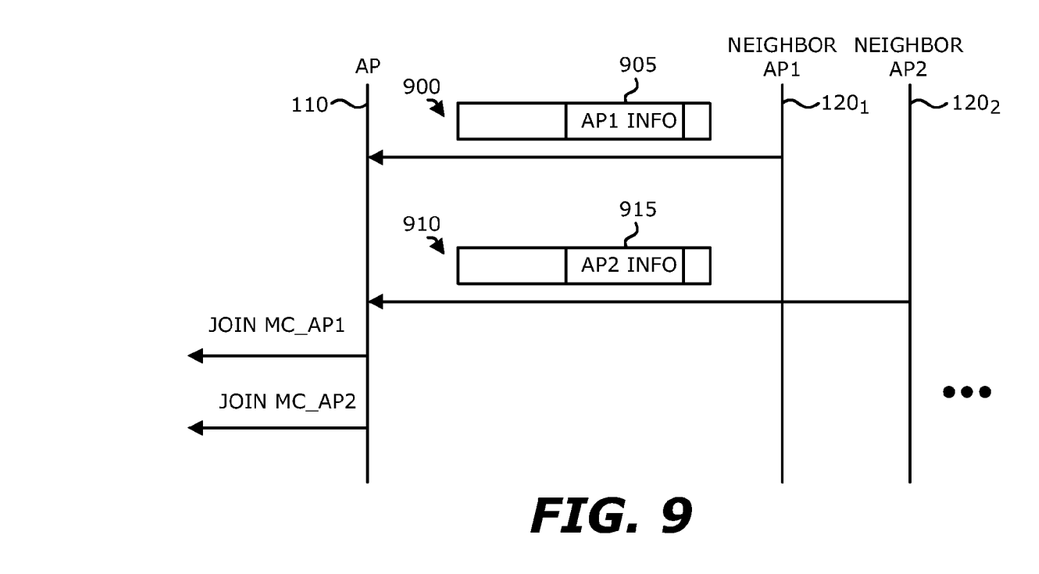
FIG. 9 is an exemplary sequence diagram illustrating the multicast distribution scheme conducted by the network device (AP) of FIGS. 1 and 2 for state synchronization.

Referring to FIG. 9, an exemplary sequence diagram illustrating the multicast distribution scheme conducted by a network device (e.g. AP 110 of FIGS. 1-2) for state synchronization is shown. Herein, each AP within the network (e.g. AP 110, neighboring AP $120_1$, neighboring AP $120_2$, etc.) is assigned a multicast Internet Protocol (IP) address, which is based on information uniquely associated with that corresponding AP. As an example, a multicast IP address for a particular AP may be produced from at least a portion of the MAC address for that particular AP. More details of various MAC-to-Multicast_IP conversion schemes are described below.

As illustrated in FIG. 9, all APs within the network, such as neighboring AP $120_1$ and $120_2$ as shown, are configured to periodically broadcast messages 900 and 910. In accordance with one embodiment of the disclosure, these broadcast messages 900 and 910 may be BEACON frames; however, these BEACON frames 900 and 910 are configured to advertise information associated with a corresponding neighboring AP $120_1$ and $120_2$, respectively. This information is placed within prescribed information elements of BEACON frames 900 and 910.

As an example, information within BEACON frame 900 may be a multicast group address hosted by neighboring AP $120_1$ while information within BEACON frame 910 may be a multicast group address hosted by neighboring AP $120_2$. As another example, the information within each BEACON frame 900 or 910 may be unique to a corresponding neighboring AP $120_1$ and $120_2$, such as a MAC address (or portion thereof). The corresponding MAC addresses are placed within prescribed information elements of BEACON frames 900 and 910. The MAC addresses are subsequently used to compute the multicast IP addresses for neighboring AP $120_1$ and $120_2$.

Figure 10:
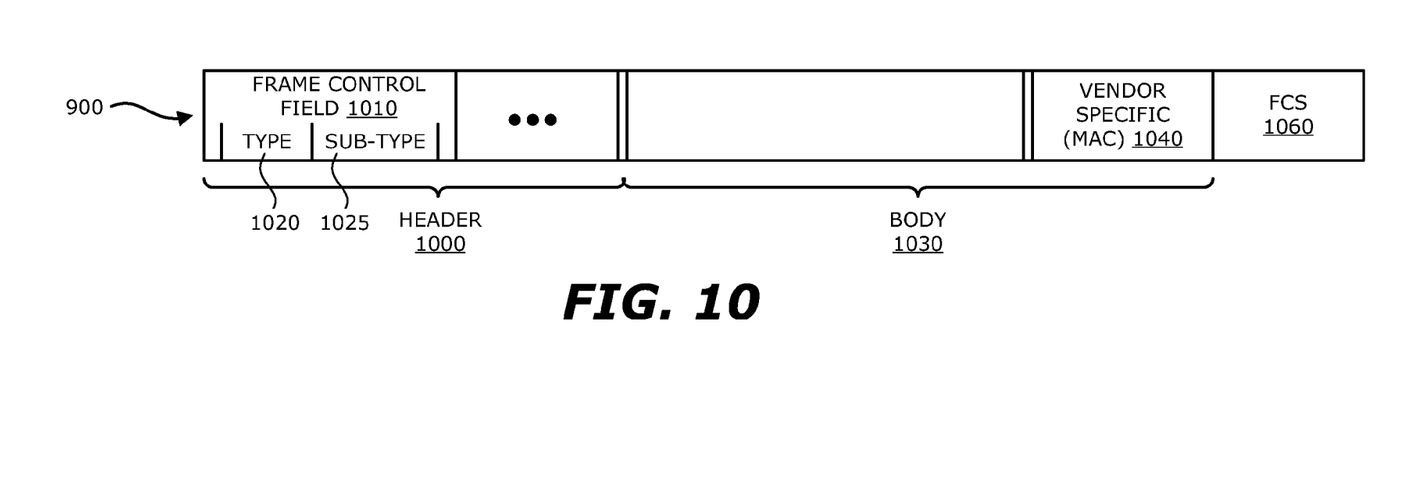
FIG. 10 is an exemplary data structure diagram of a BEACON message of FIG. 9.

More specifically, as illustrated in FIG. 10, an exemplary data structure diagram of BEACON frame 900 in accordance with the IEEE 802.11 Standard is shown. Herein, the BEACON frame 900 comprises a header 1000, a frame body 1030 and a frame check sequence (FCS) 1060. Herein, the header 1000 includes a frame control field 1010 that includes a type field 1020 and subtype field 1025 that are used to identify the frame as a management frame type ("00") and a Beacon subtype ("1000").

The frame body 1030 includes a vendor specific information element 1040 within which the MAC address associated with the neighboring AP $120_1$ is loaded. Similar to FIG. 5 above, the vendor specific information element 1040 comprises multiple subfields in which the MAC address is stored within a vendor-specific content field.

Referring back to FIG. 9, it is contemplated that the periodicity of such advertisement may be conducted every "p" number of BEACON frames (p≥1). For instance, every BEACON frame (e.g. p=1) from neighboring AP $120_1$ may be configured to include the unique information (e.g. MAC address) 905 for neighboring AP $120_1$, or alternatively, every $10^{th}$ BEACON frame (p=10) from neighboring AP $120_1$ may be configured to include the MAC address 905. Similarly, every $p^{th}$ BEACON frame from neighboring AP $120_2$ includes unique information (e.g. MAC address) 915 for neighboring AP $120_2$.

Upon receiving BEACON frames 900 and 910, if applicable, AP 110 is now able to derive the multicast IP addresses for neighboring AP $120_1$ and $120_2$ from the recovered MAC addresses 905 and 915, respectively. The multicast IP generation logic 285 within AP 110 of FIG. 2 is configured to perform the MAC-to-Multicast_IP conversion.

Figure 11A:
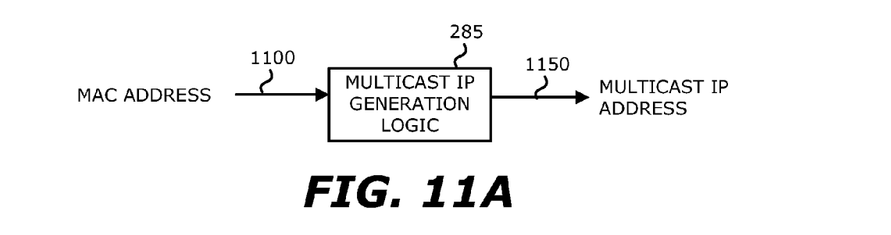
FIG. 11A is an exemplary block diagram illustrating multicast IP generation logic adapted to convert information associated with the Media Access Control (MAC) address into a corresponding multicast Internet Protocol (IP) address.

As shown in FIG. 11A, an exemplary block diagram illustrating the general operations conducted by the multicast IP generation logic 285 is shown, where computing of the multicast address for the multicast group is based at least on a portion of information associated with a neighboring network device. Herein, the multicast IP generation logic 285 is adapted to convert input information 1100 uniquely associated with a particular neighboring AP into a corresponding multicast IP address 1150 for that neighboring AP. The unique information 1100 may include some or all of the MAC address of the particular neighboring AP, although other information unique to the neighboring AP may be used. Also, such conversion may be accomplished through one or more prescribed address translations, including translations in which at least portion of the MAC address is used as part of the multicast IP address without modification, at least a portion of the MAC is modified in accordance with a prescribed translation (e.g., undergoes one-way hash operation, logical modification with up to bitwise granularity, etc.) and used as part of the multicast IP address, or the like.

Figure 11B:
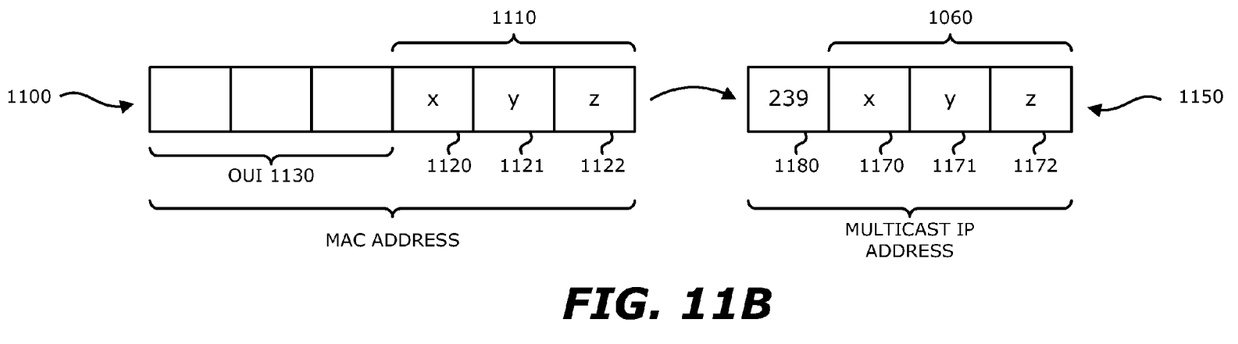
FIG. 11B is an exemplary block diagram illustrating a particular conversion scheme for generating the multicast IP address from the MAC address.

As an illustrative embodiment, as shown in FIG. 11B, a particular conversion scheme for generating the multicast IP address from the MAC address is shown. Herein, a portion of the MAC address 1100, such as one or more octets 1110 of MAC address 1100 may be provided, without modification, as octets 1160 of IP multicast address 1150. According to one embodiment of the disclosure, the last three octets 1120-1122 of MAC address 1100 may be provided as corresponding octets 1170-1172 of IP multicast address 1150. A first octet 1180 of the IP multicast address 1150 is assigned a prescribed value (e.g., "239" or "11101111" binary).

Of course, it is contemplated that other conversion schemes may be deployed in lieu of the illustrative embodiment set forth in FIG. 11B. For instance, the particular conversion scheme for generating the multicast IP address from the MAC address may be conducted where the octets 1120-1122 are uniquely translated into different values that are placed into octets 1170-1172 of IP multicast address 1150. For instance, octets 1120-1122 may undergo logical functions (e.g., AND, NAND, OR, XOR, NOR, XNOR, etc.) and/or bitwise repositioning to produce the values for octets 1170-1172 of IP multicast address 1150. Again, the first octet 1180 of the IP multicast address 1150 could be assigned the prescribed value.

Yet another conversion scheme for generating the multicast IP address from the MAC address may be conducted by converting the Organizationally Unique Identifier (OUI) 1130 of the MAC address. For example, the OUI may undergo a logical translation to produce the values for octets 1170-1172.

Yet another conversion scheme for generating the multicast IP address from the MAC address may be conducted by a one-way hash function where some or all of MAC address 1100 is uniquely converted into octets 1170-1172 of IP multicast address 1150.

Referring back to FIG. 9, as a result of the MAC-to-Multicast_IP conversion, AP 110 is able to subscribe to multicast groups associated with all its neighboring APs (e.g., neighboring APs $120_1$ and $120_2$). Subscription may be responsive at least to detecting wireless signals from one or more of the neighboring APs $120_1$ and $120_2$ having a signal strength above a particular threshold, determining that the one or more of the neighboring APs $120_1$ and $120_2$ is an access point, etc. Identical operations may be performed by neighboring AP $120_1$ to obtain state information from APs 110 and $120_2$ and neighboring AP $120_2$ to obtain state information from APs 110 and $120_1$. Hence, AP 110 and neighboring APs $120_1$ and $120_2$ may publish their state information when necessary via these multicast groups. A subscription to a multicast group may be conducted in order to obtain state information associated with network device members, and in certain cases, AP 110 may simply want to copy the multicast subscriptions its neighboring APs are receiving.

Figure 12:
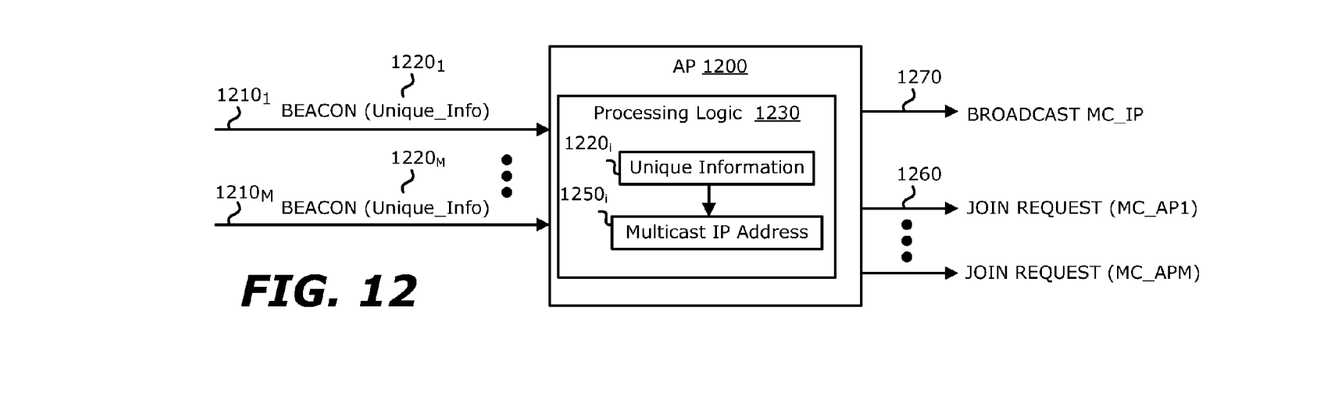
FIG. 12 is an exemplary block diagram illustrating the network device (AP) conducting the multicast distribution of state information to synchronizing state information with neighboring APs.

Referring now to FIG. 12, an exemplary block diagram illustrating the network device 1200 (e.g. AP) conducting the multicast distribution of state information to synchronizing state information with neighboring APs is shown. Herein, during passive scanning of different wireless channels, the network device 1200 receives one or more messages (e.g. BEACON frames) $1210_1$-$1210_M$ from corresponding neighboring network devices (not shown). One or more of these messages $1210_i$ ($1 \le i \le M$) includes information $1220_i$ (e.g. MAC address) that is uniquely associated with a sending neighboring network device.

Subsequent to receiving message $1210_i$ ($1 \le i \le M$) and accessing the corresponding unique information $1220_i$ therefrom, such as a MAC address from BEACON frame $1210_i$ sent by one of the neighboring APs for example, processing logic 1230 converts the unique information $1220_i$ into the multicast IP address $1250_i$ for the neighboring network device that sent message $1210_i$. Thereafter, the network device 1200 is able to subscribe to a multicast group associated with the neighboring network device that sent the message $1210_i$ by sending an Internet Group Management Protocol (IGMP) JOIN Group Request 1260, where the computed multicast IP address $1250_i$ operates as the group address of the JOIN Group Request 1260. Thereafter, the network device 1200 may publish its state information for access by network devices subscribing to the multicast group associated with multicast IP address $1250_i$ via multicast message 1270.

These operations may be conducted by network device 1200 to acquire membership to all multicast groups associated with the neighboring network devices. Also, the neighboring network devices can perform these operations to distribute state information between their neighboring network devices.

C. Wired Distribution of State Information Between Network Devices

Figure 13:
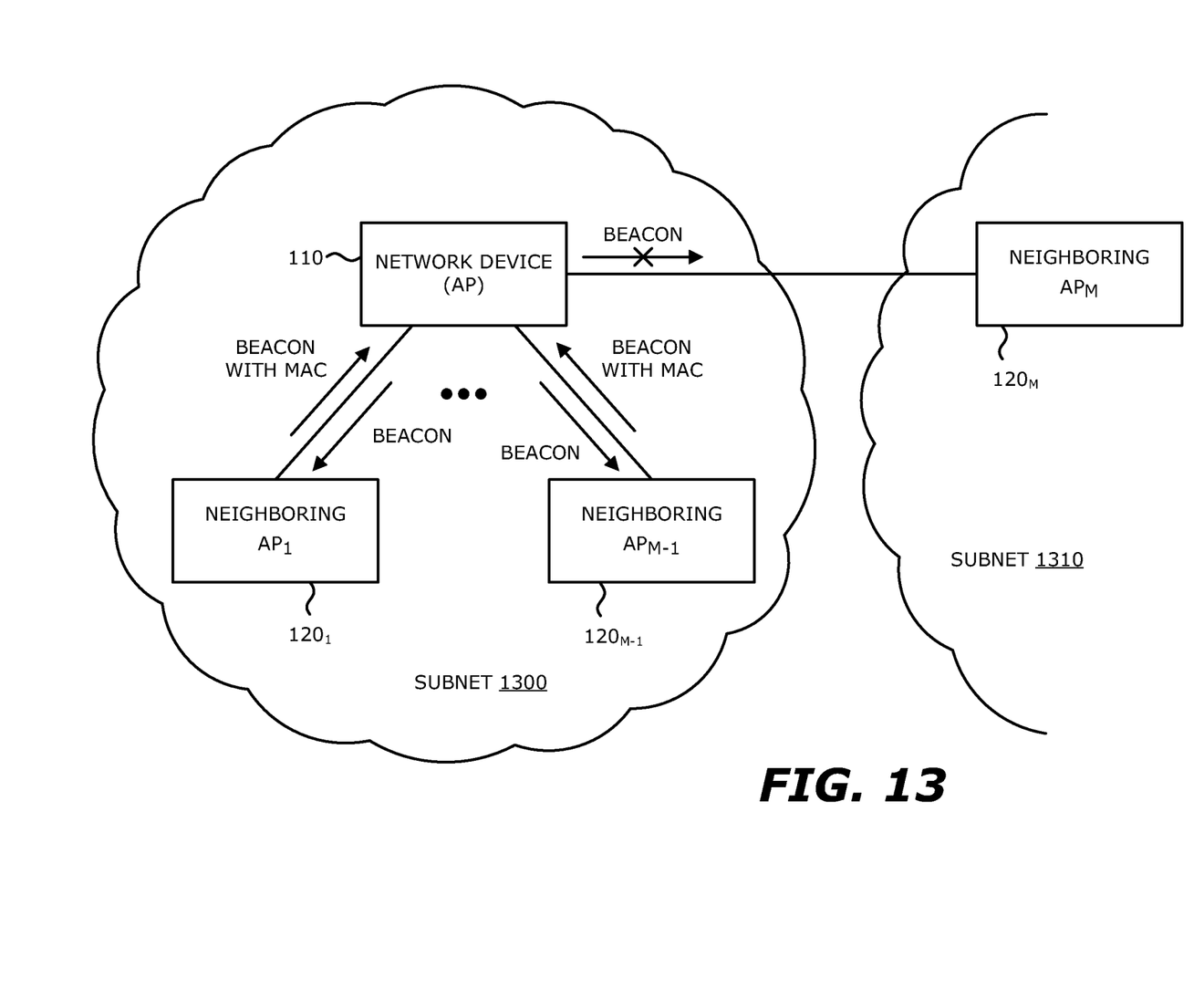
FIG. 13 is an exemplary diagram illustrating the wired distribution scheme conducted by the network device (AP) of FIGS. 1 and 2 for state synchronization.

Referring to FIG. 13, an exemplary diagram illustrating the wired distribution scheme conducted by the network device (AP) of FIGS. 1 and 2 for state synchronization is shown. Herein, similar to FIG. 9, the MAC address of every AP is advertised in an information element within a BEACON message, every "p" number of beacons. As illustrated, AP 110 transmits beacons to neighboring APs $120_1$-$120_M$. All the APs 110 & $120_1$-$120_M$ in the same broadcast domain maintain a list of MAC addresses of its neighbor APs.

In the event that AP 110 needs to publish its own state information, wired distribution logic 290 of AP 110 is configured to control the broadcast of a message in its subnet (e.g. subnet 1300), where the message includes state information for AP 110 and identifies AP 110 in the source address. In response to receiving the broadcasted message, each neighboring AP $120_1, \ldots,$ and/or $120_M$ will process the message if the source address of the message is associated with a RF neighbor (e.g. AP 110).

If a neighboring AP $120_M$ does not belong to the subnet 1300 and belongs to a different subnet 1310, then a broadcast transmission will be unsuccessful for neighboring AP $120_M$. Instead, unicast messages will need to be sent from AP 110 to the neighboring AP $120_M$.

Use of Distributed State Information

Figure 14:
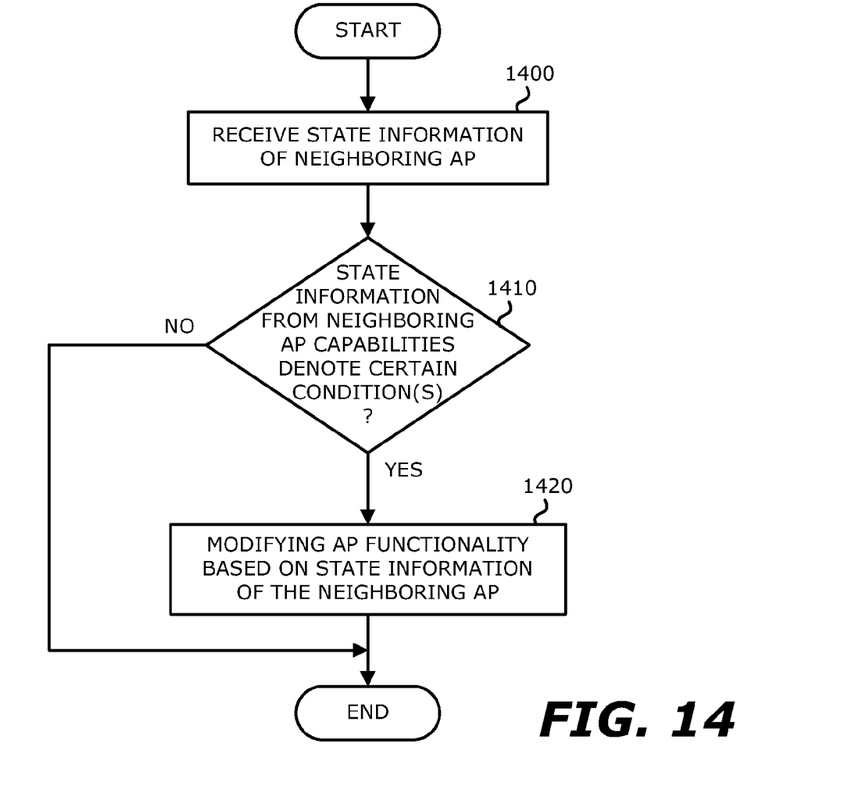
FIG. 14 is a flowchart describes exemplary operations conducted after receipt of the distributed state information.

Referring now to FIG. 14, a flowchart describes exemplary operations conducted after receipt of the distributed state information is shown. Herein, upon receiving state information from a neighboring network device (e.g. neighboring AP), the network device (e.g. AP) is configured to determine if the state information from the neighboring network device(s) denotes a certain condition that requires the AP to adjust its functionality (blocks 1400 and 1410). Such conditions are triggered to assist operability of one of the neighboring network devices, and thus, optimize functionality of the wireless network as a whole. If such a condition exists, the AP adapts its functionality and/or capability, which may be restored based on changes in the overall network environment (block 1420).

In general, the AP (network device) may receive the state information for providing one or more services to a client device (a) currently associated with the AP and (b) was previously associated with another AP. For instance, as an illustrative embodiment, based on state information received from one or more of the neighboring APs, an AP may reduce the amount of time for authenticating a client device roaming to the AP from one of the neighboring APs. More specifically, by receiving OKC information from a neighboring AP with whom the client device is currently associated and if the client now seeks to associate with the AP, the AP does not need to conduct a full authentication exchange (IEEE 802.1X authentication). Rather, the AP may perform a 4-way handshake to establish transient encryption keys.

As another illustrative embodiment, the AP, namely a first network device, may modify its channel access request configuration based on the received state information. For instance, based on state information provided by one or more of the neighboring APs, the AP may modify its functionality by precluding any further client devices from successfully associating with the AP. Also, the AP may identify those client devices where network functionality may be improved by movement of such client devices to another neighboring AP. Such identification may involve (i) matching capabilities of the AP and neighboring APs learned from shared state information with capabilities of the client devices (e.g., matching client devices operating in accordance with IEEE 802.11n with APs supporting this communication standard), (ii) encouraging a distributed association of client devices normally involved with video and/or audio data traffic (e.g. smartphones or laptops), (iii) detection of increased interference, or the like.

Once the client devices are identified for movement, the AP may encourage these identified client devices to roam by reducing services provided thereto, signaling a particular neighboring AP to advertise better services to the identified client device, or even disassociating the identified client device.

As yet another illustrative embodiment, based on state information directed to metrics associated with bandwidth or processor utilization that are provided from one or more of the neighboring APs, the AP may reduce its operating parameters. For example, the AP may narrow the bandwidth of its home channel (e.g. reduce channel bandwidth from 40 megahertz "MHz" to 20 MHz). Such alteration may be conducted by the network device in order to reduce its demand for network bandwidth, especially if a neighboring AP is currently handling higher priority data traffic (e.g., video and/or audio) than the AP, or the optimal operations of the AP is of lesser importance than the optimal operations of one of the neighboring APs (i.e. neighboring AP has a higher priority of operation than the AP).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable medium storing instructions which, when executed by one or more hardware processors, causes performance of operations comprising:
   detecting, by a first access point, a second access point within a radio frequency (RF) communication range from the first access point;
   responsive at least to detecting the second access point, subscribing, by the first access point, to a multicast group hosted by the second access point;
   receiving, by the first access point, multicast data associated with the multicast group from the second access point; and
   modifying, by the first access point, a channel access request configuration of the first access point based on the received multicast data.

2. The non-transitory computer readable medium of claim 1, wherein subscribing to the multicast group responsive at least to detecting the second access point comprises subscribing to the multicast group in response to detecting that wireless signals from the second access point have a signal strength above a particular threshold.

3. The non-transitory computer readable medium of claim 1, wherein subscribing to the multicast group hosted by the second access point further comprises receiving a multicast address in a beacon message from the second access point.

4. The non-transitory computer readable medium of claim 1, wherein subscribing to the multicast group hosted by the second access point comprises computing a multicast address associated with the multicast group based at least on a portion of information associated with the second access point.

5. The non-transitory computer readable medium of claim 1, wherein the operations further comprise using the received multicast data to provide one or more services to a client device currently associated with the first access point and previously associated with the second access point.

6. The non-transitory computer readable medium of claim 1, wherein the operations further comprise modifying of a configuration of the first access point to preclude any additional client devices from successfully associating with the first access point.

7. The non-transitory computer readable medium of claim 1, wherein the operations further comprise modifying a configuration of the first access point to narrow a bandwidth of a wireless channel utilized by the first access point based on information within the received multicast data.

8. The non-transitory computer readable medium of claim 1, wherein the multicast data transmitted to members of the multicast group is determined by the second access point.

9. The non-transitory computer readable medium of claim 1, wherein the operations further comprise:
   subscribing, by the first access point, to a multicast group hosted by the third access point; and
   receiving, by the first access point, multicast data associated with the multicast group hosted by the third access point.

10. A first access point comprising:
    one or more radio units to receive wireless signals from a second access point within a radio frequency (RF) communication range from the first access point; and
    at least one hardware processor coupled to the one or more radio units, wherein the at least one hardware processor is to control the first access point to subscribe to a multicast group hosted by the second access point in response to detecting the wireless signals from the second access point, receive multicast data associated with the multicast group from the second access point subsequent to the first access point joining the multicast group, and modify a channel access request configuration of the first access point based on the received multicast data.

11. The first access point of claim 10, wherein the first access point is to subscribe to the multicast group in response to determining that the wireless signals, from the second access point, have a signal strength above a particular threshold.

12. The first access point of claim 10, wherein the at least one hardware processor is to control the first network device to compute a multicast address associated with the multicast group based on a portion of information associated with the second access point.

13. The first access point of claim 10, wherein the at least one hardware processor is further to control the first network device to use the received multicast data to provide one or more services to a client device currently associated with the first access point and previously associated with the second access point.

14. The first access point of claim 10, wherein the at least one hardware processor is further to modify a configuration of the first access point to preclude any additional client devices from successfully associating with the first access point.

15. The first access point of claim 10, wherein the at least one hardware processor is further to narrow, based on information within the received multicast data, a bandwidth of a wireless channel being utilized by the one or more radio units.

16. The first access point of claim 10, wherein the multicast data transmitted to members of the multicast group is determined by the second access point.

17. The first access point of claim 10, wherein the at least one hardware processor is further to control the first access point to subscribe to a multicast group hosted by a third access point, and receive multicast data associated with the multicast group hosted by the third access point.

18. A non-transitory computer readable medium implemented within a first access point and comprising instructions which, when executed by one or more hardware processors, cause the one or more hardware processors to:
receive a message from a second access point, wherein the message comprises state information of the second access point;
determine a multicast address for a multicast group hosted by the second access point based at least on the state information received in the message;
subscribe, by the first access point, to the multicast group hosted by the second access point;
receive, by the first access point, multicast data associated with the multicast group hosted by the second access point; and
modify a configuration of the first access point to reduce a functionality of the first access point to assist an operation ability of the second access point.

19. The non-transitory computer readable medium of claim 18, wherein the state information comprises Opportunistic Key Caching (OKC) information used to initiate a 4-way handshake authentication.

20. The non-transitory computer readable medium of claim 18, wherein the state information comprises load capacity of the second access point.

21. The non-transitory computer readable medium of claim 20, wherein the load capacity comprises a number of client devices in association with the second access point.

22. The non-transitory computer readable medium of claim 20, wherein the load capacity comprises processor utilization information for the second access point.

23. The non-transitory computer readable medium of claim 18, wherein the state information comprises operating bandwidth to convey one or more wireless channels utilized by the second access point.

24. The non-transitory computer readable medium of claim 18, wherein the modified configuration reduces an amount of time to authenticate a client device roaming to the first access point from a neighboring access point.

25. The non-transitory computer readable medium of claim 18, wherein the modified configuration narrows a bandwidth of a home channel for the first access point.

26. The non-transitory computer readable medium of claim 18, wherein the modified configuration precludes further client devices from successfully associating with the first access point.

27. The non-transitory computer readable medium of claim 18, wherein receiving the message by the first access point from the second access point is in response to a PROBE REQUEST message transmitted by the first access point, wherein the PROBE REQUEST message includes state information of the first access point.

* * * * *